United States Patent [19]

Naya et al.

[11] 3,832,068

[45] Aug. 27, 1974

[54] THREE COLOR METER WITH A CALCULATOR

[75] Inventors: Mikio Naya; Haruki Yamaguchi, both of Toyokawa; Izumi Horie, Toyohashi, all of Japan

[73] Assignee: Minolta Camera Co., Ltd., Osaka-fu, Japan

[22] Filed: Nov. 20, 1972

[21] Appl. No.: 307,829

Related U.S. Application Data

[63] Continuation of Ser. No. 117,893, Feb. 23, 1971.

[52] U.S. Cl.............................. 356/173, 356/228
[51] Int. Cl............................................. G01j 1/42
[58] Field of Search .......... 356/177, 201, 223, 224, 356/226, 228, 173

[56] References Cited
UNITED STATES PATENTS

| | | | |
|---|---|---|---|
| 2,406,716 | 8/1946 | Sweet.................. | 356/226 |
| 2,584,440 | 2/1952 | Fogle................... | 356/228 |
| 2,882,786 | 4/1959 | Kaye.................... | 356/177 |
| 2,891,438 | 6/1959 | Fuhrman.............. | 356/201 |
| 2,924,144 | 2/1960 | Bakke et al.......... | 356/228 |
| 3,067,649 | 12/1962 | Szymczak........... | 356/226 |
| 3,096,137 | 7/1963 | Silard.................. | 356/201 |
| 3,377,467 | 4/1968 | Staunton et al..... | 356/201 |
| 3,561,878 | 2/1971 | Kiess................... | 356/228 |
| 3,574,443 | 4/1971 | Nanba.................. | 356/223 |
| 3,582,659 | 6/1971 | Dekker................. | 356/224 |

Primary Examiner—William L. Sikes
Attorney, Agent, or Firm—Watson, Cole, Grindle & Watson

[57] ABSTRACT

A three color meter with a calculator in accordance with the present invention is so constructed that the whole measuring range of a color meter is divided into a plurality of divisional measuring ranges; and a pointer and a scale graduated at equal intervals with the mired unit and common to every range are provided; and an indicating means for indicating the color temperature value as deviation for the central value of every range shown by the mired unit and the R·G index, first and second scale disks corresponding thereto, a manual operation member for the division setting member, and a transparent scale disk concentric with said first and second scale disks are equipped; the linear relation between the color temperature value of said indicating means and the logarithm of the spectral energy ratio is arranged to be held by compensating an electrical circuitry; and further in measuring R·G spectral energy ratio it is possible to obtain in high precision the color temperature conversion filter coefficient and the green wave length compensation filter coefficient for an illumination source suitable for a photosensitive material to be used in color photographing by artificial illumination, making use of the approximation based on the Wien formula.

1 Claim, 7 Drawing Figures

THREE COLOR METER WITH A CALCULATOR

This is a continuation, of U.S. Pat. application Ser. No. 117,893, filed Feb. 23, 1971.

BACKGROUND OF THE INVENTION

The present invention relates to a three color meter with a calculator, and more particularly relates to a three color meter with a calculator in which it is possible to measure the whole measuring range by dividing into a plurality of divisional measuring ranges, and by taking a compensative means so as to apply a common and single equal-interval scale to said divisional measuring ranges, the linear relation is held between the color temperature represented by the mired unit and the logarithm of spectral energy ratio, and thereby in measuring the spectral energy ration of red to green it is possible to keep the high precision in the approximation based on the Wien formula.

Generally in color photographing or cinematic photographing, or color television photographing, especially in the case under artificial illumination, it is required to look for a color temperature conversion filter coefficient and a green wave length compensation filter coefficient in order to change the color temperature of an illumination source, namely, the spectral energy distribution characteristic to a color temperature suitable for a photosensitive material used.

For the color photosensitive material used for color photographing, the color temperature of illumination source is appointed for obtaining the color balance desired in accordance with the developed color character of said color photosensitive material.

It is required, therefore, when photographing, to measure the spectral energy distribution characteristic of an illumination source and calculate the difference between said spectral energy distribution characteristic and the color temperature appointed to the photosensitive material, and thus make use of a filter such as for cancelling said difference to adjust the illumination light for the given color temperature. In this case, when the spectral energy distribution characteristic of the illumination source is the same as the spectral energy distribution characteristic of black body radiation which is a standard of the color temperature, or very approximate thereto, it is only required to look for color temperature M1 of the illumination source from the ratio of energy $E_{RL}$ of the red wave length range to energy $E_{BL}$ of the blue wave length range and calculated difference $M_a$ between said color temperature $M_1$ and color temperature $M_m$ appointed to the photosensitive material, and thus make use of a color temperature conversion film such as for cancelling said color temperature difference $M_d$.

However, the spectral energy distribution characteristic of the general illumination source is different of that of the black body radiation, so that by making use of a color temperature conversion filter selected in said manner it is impossible to obtain the spectral energy distribution characteristic appointed to the photosensitive material. It is required, therefore, to compensate the spectral energy distribution characteristic difference further to that obtained in said manner. The device which is able to detect the spectral energy distribution characteristic difference as well as the color temperature as described above is a tricolored color thermometer.

That is, according to the three color meter the color temperature can be obtained from the spectral energy ratio of red to blue and at the same time it is possible to look for the spectral energy difference is green wave length between a black body radiation having the same color temperature and an illumination source to be measured, namely, the spectral energy distribution characteristic difference, from the spectral energy ratio of red to green, and convert the illumination source to a spectral energy distribution characteristic desired by making use of said green wave length compensation filter together with said color temperature conversion filter.

Whereas, many of three color meters in the prior art, only the color temperature of illumination source, or the index for showing the spectral energy distribution characteristic thereof is measured. For a photosensitive material given, therefore, in order to look for a coefficients of a color temperature conversion filter to be used for said illumination source and a green wave length compensation filter it is required to specially calculate. And, the three color meter with a calculator also is well known, however, it is a color meter making use of a single scale means covering all over the measuring range, so that the measuring precision is low and it is impossible to obtain the satisfactory measurement, and in addition a mistake in observation and a measuring error are apt to take place because the scale is not equal in intervals and also the handling thereof is to much trouble.

This inventor has made an application in U.S. Pat. Ser. No. 804,165 for a three color meter with a calculator for looking for the color temperature from the multi-range by dividing the whole measuring range into a plurality of divisional ranges. In this invention a photoconductive element is put to use a photoreceiving element and the changeover of range is carried out through the ratio of the permeability of ND filter, therefore, there are such drawbacks as the precision of changing over the range is low and the photoconductive element is large in unevenness of the output current for the intensity of incident light and accordingly the linearity can not be obtained.

Whereas, this inventor has made another application in U.S. Pat. Ser. No. 45,125 for a color temperature meter in which instead of the photoconductive element a silicon photoelectromotive element is put to use, and in order to improve a drawback that the output current of the silicon photoelectromotive element for bettering the linearity is low especially in the low illuminance range, a photoelectric conversion circuit for turning respective output current proportional to the intensity of two kinds of spectral energies in the wave length ranges different on account of a plurality of silicon photoelectromotive elements to the output voltage proportional to the logarithm thereof, and a differential amplifier circuit for detecting the output voltage difference thereof are provided.

Thereupon, the present invention is an improvement for said inventions, and in order to measure by dividing the whole measuring range into a plurality of divisional ranges the electrical circuitry is divided, and in respective range divided the color temperature conversion filter coefficient and the green wave length compensation filter coefficient making use of the approximation based on the Wien formula can be obtained in high precision by means of a culculator provided with a single

OBJECT OF THE INVENTION

One object of the present invention is to remove the prior drawbacks mentioned above and provide a novel three color meter with a calculator, which is able to read the color temperature value of the absolute temperature unit, the color temperature conversion filter coefficient, and the green wave length compensation filter coefficient in high precision in accordance with the indication of a color meter.

Another object of the present invention is to provide a three color meter which is able to obtain the good precision in the approximation based on the Wien formula in measuring the spectrum energy ratio of red to green, holding at all times the color temperature represented by the mired unit and the logarithm of the spectral energy ration in the linear relation.

Further other objects of the present invention will be cleared from the description of an embodiment disclosed hereinafter in accordance with the present invention.

SUMMARY OF THE INVENTION

The present invention relates to a three color meter with a calculator, which is able to obtain in high precision the color temperature conversion filter coefficient and green wave length compensation filter coefficient for turning to the color tone for looking for an illumination source, by dividing the whole measuring range of a color thermometer into a plurality of divisional measuring ranges, and compensating so as to apply a common and single equal interval scale to said every divisional measuring range to hold the linear relation between the color temperature represented by the mired unit of an illumination source and the logarithm of spectral energy ratio, and further making use of the approximation based on the Wien formula in measuring the spectral energy ratio of red to green in said illumination source.

That is, the three color meter is able to look for the color temperature from the spectral energy ratio of red to blue and see the spectral energy difference in green wave length between the black body radiation in the same color temperature and the illumination source, namely the spectral energy distribution characteristic difference fixed on the basis of the black body radiation, from the energy ratio of red to green.

Said spectral energy distribution can calculate simply the spectral energy distribution difference of any illumination source, in the case of black body radiation, by making use of such an index as a value obtained from the spectral energy ratio of red to green becomes one-half of a value obtained from the spectral energy ratio of red to blue.

In general, spectral energy $E_\gamma$ in a specific wave length $\lambda$ of black body radiation of color temperature $T°K$ is as follows from the Wien formula:

$$E_\gamma = C_1 \lambda^{-5} e^{-(C_2/\lambda T)}$$

Wherein, $C_1$ and $C_2$ are respectively a constant. The spectral energy ratio in specific two wave lengthes, for example, red wave length and blue wave length is as follows:

$$E_B/E_R = [(\lambda_B/\lambda_R)] 5 \cdot e (C_2/T) [(1/\lambda_R) - (1/\lambda)]$$

Wherein,
$E_B$: spectral energy of blue wave length.
$E_R$: spectral energy of red wave length.
$\lambda_B$: blue wave length.
$\lambda_R$: red wave length.

Hereupon, provided wave lengthes $\lambda_B$, $\lambda_R$ are respectively a constant value predetermined, the logarithm of both sides is as follows:

$$\log(E_B/E_R) = (A_1/T) + B_1$$

Wherein, $A_1$ and $B_1$ become respectively a constant including the wave length value, and $\log(E_B/E_R)$ which is a logarithm of the spectral energy ratio become the lineal relation to the inverse number of color temperature T. Here, color temperature T can be represented as well by the mired unit shown by the following conversion formula:

$$M(\text{mired}) = 10^6/T(°K)$$

Therefore, M which color temperature is represented by the mired unit and the logarithm of the spectral energy ratio will have the linear relation as shown by the following formula:

$$\log(E_B/E_R) = A'_1 M + B_1$$

And further, it is obvious that said relation is formed also for the spectral energy ratio of red to green in the same way, as shown by the following formula:

$$\log(E_G/E_R) = A_2 M + B_2$$

By setting up the spectral sensitivity, the light receiving optical system, and the circuit constant for the instrument so as to obtain $A'_1 = 2A_2$ and $B_1 = 2B_2$, as described above one-half of the valve obtained from the spectral energy ratio of red to blue becomes the value obtained from the spectral energy ratio of red to green.

And, in the present invention, for the color temperature of $T°K$ the value $G_M$ obtained from the spectral energy ratio of red to green is set as shown by the following formula:

$$G_M = (1/2)[(10^6/5,000(°K)) - (10^6/T(°K))] \quad (1)$$

Here, for the spectral energy characteristic related to the black body radiation the Planck formula is popular, and in the Wien formula as the color temperature gets higher said characteristic comes further out of the actual value, however, in the present invention by measuring the whole measuring range in dividing into a plurality of divisional measuring ranges and by taking a compensative means so as to apply a common equal interval scale to said every divisional measuring range, the color temperature represented by the mired unit and the logarithm of the spectral energy ratio are held in the lineal relation at all times, and in measuring the spectral energy ratio of red to green the wave length difference is small, so that it is possible to obtain the good precision in the approximation based on the Wien formula.

DESCRIPTION OF THE PREFERRED EMBODIMENT

Figure 1:
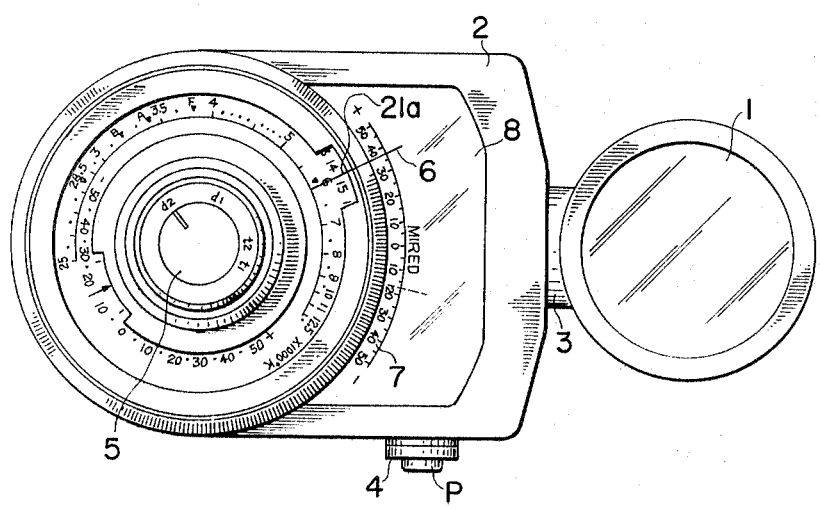
FIG. 1 is a front outside view of an embodiment in accordance with the present invention.
Figure 2:
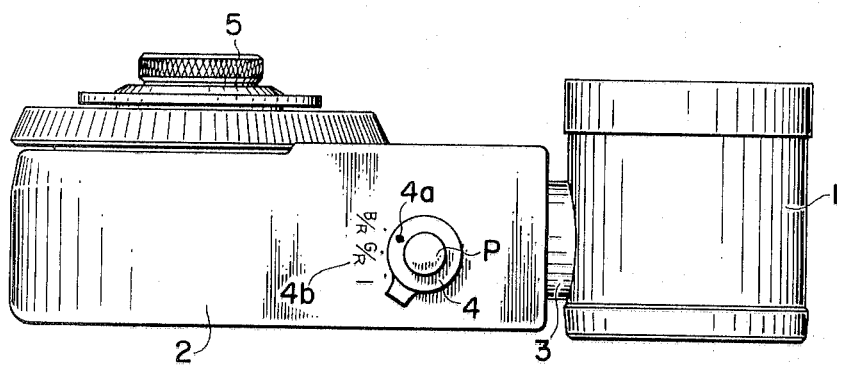
FIG. 2 is a side outside view of said embodiment.

With reference to the accompanying drawings of an embodiment in accordance with the present invention, in FIG. 1 and FIG. 2 reference numeral 1 is a light receiving portion rotatably connected with main body 2 by connecting rod 3. Numeral 4 denotes a selective lever which is changed over to measure illuminance(I), spectral energy ratio (G/R) of red to green, and spectral energy ratio (B/R) of red to blue respectively by putting index $4a$ upon scale $4b$ shown by I, G/R, B/R respectively. On the center of said selective lever 4 push button P is formed for opening/closing the measuring circuit later described. Numeral 5 is a knob for changing over the measuring range, 6 an ammeter pointer, and 7 a scale which is graduated with the mired unit for said pointer 6 and read through transparent window 8 provided on the top of main body 2.

Figure 3:
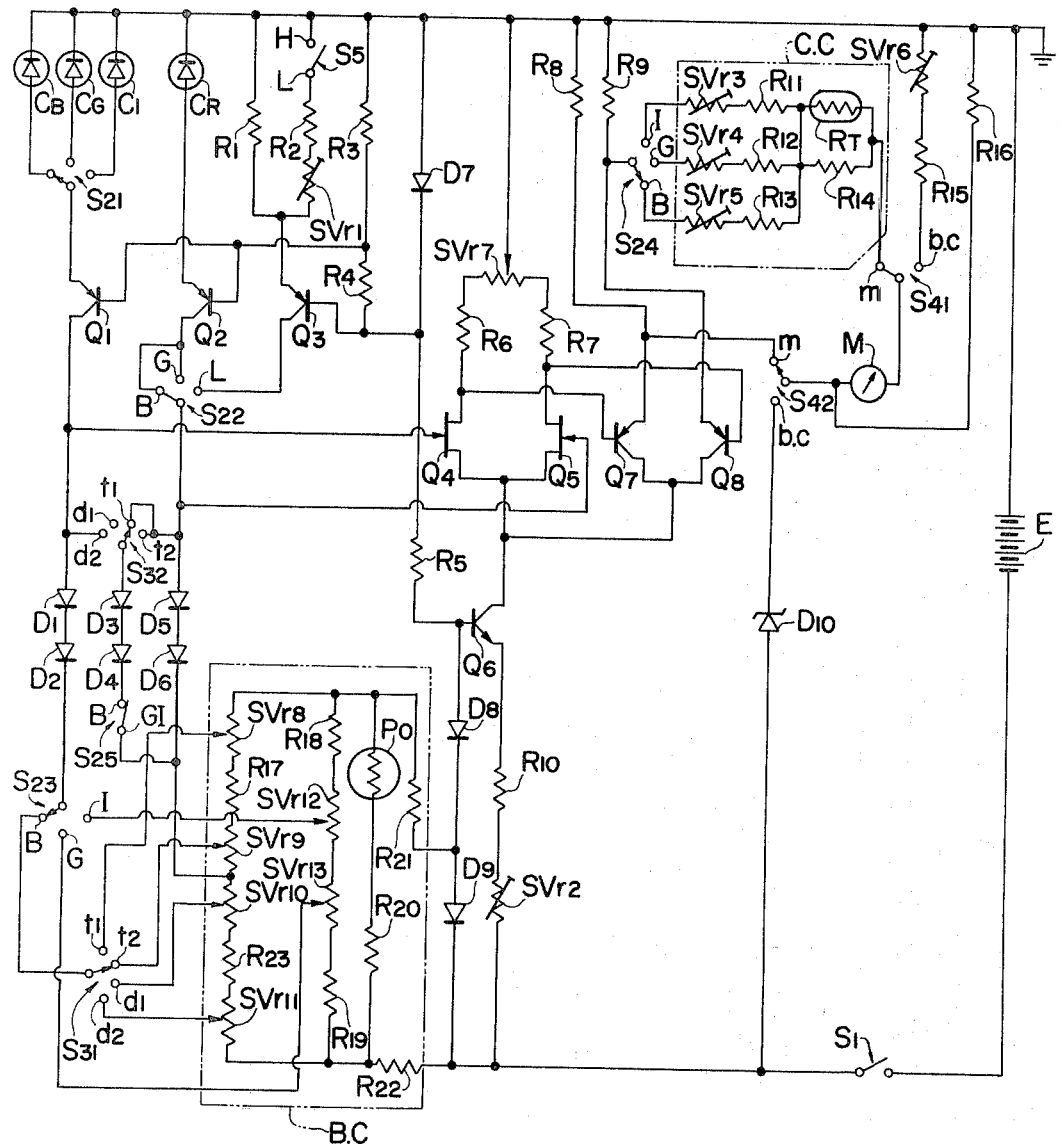
FIG. 3 is a circuit formation diagram of said embodiment.

The measuring circuit is shown in FIG. 3, wherein $C_B$, $C_G$, $C_I$, and $C_R$ are respectively a silicon photoelectromotive element, and $C_B$ has the spectral sensitivity for the blue wave length, $C_G$ for the green wave length, and $C_R$ for the red wave length respectively, and $G_I$ has the spectral sensitivity given to measure the illuminance in the whole visual wave length range.

$Q_1$ is a transistor which forms a photoelectric converter circuit for generating the voltage proportional to the logarithm of the intensity of the spectral energy measured by one of silicon photoelectromotive elements $C_B$, $C_G$, $C_I$, on both ends of diodes $D_1$, $D_2$, together with resistances $R_3$, $R_4$ for dividing the voltage generated on both ends of diodes $D_7$, and diodes $D_1$, $D_2$. $Q_2$ is a transistor which forms, in the same way as in said transistor $Q_1$, a photoelectric converter circuit for generating the voltage proportional to the logarithm of the intensity of the spectral energy measured by silicon photoelectromotive element $C_R$ on both ends of diodes $D_5$, $D_6$. $Q_4$, $Q_5$ are respectively an electric field effect transistor for forming a differential amplifier circuit, to respective base of which one end of said diodes $D_1$ and $D_5$ is connected. That is, the circuit composed of electric field effect transistors $Q_4$, $Q_5$ forms a differential amplifier circuit for detecting the output difference of said two kinds of photoelectric converter circuits to amplify it.

$R_6$, $R_7$ are respectively a resistance for taking out the output of said differential amplifier circuit as a voltage. And, $Q_7$, $Q_8$ are respectively a transistor for detecting the output voltage effected by said resistances $R_6$, $R_7$ to amplify it and deviating the pointer of ammeter M through the differences thereof. By means of circuits mentioned above, the difference of the logarithm values of the intensity of spectral energy, namely, the spectral energy ratio is detected, and thereby it is possible to measure the color temperature.

Besides, resistances $R_1$, $R_2$, semi-fixed resistance $SV_{r1}$, and transistor $Q_3$ form a reference voltage generating circuit for measuring the illuminance together with diods $D_5$, $D_6$, and when silicon photoelectromotive element $C_1$ is connected to transistor $Q_1$ by change over switch $S_{21}$, said reference voltage is arranged to be impressed on the base of electric field effect transistor $Q_5$ for the voltage proportional to the logarithm of the intensity of incident energy to said silicon photoelectromotive element $C_1$, by means of change over switch $S_{22}$. And, $S_5$ is a change over switch for the divisional measuring range, for measuring the illuminance by dividing into two divisional ranges of high and low, which is closed when measuring the high illuminance and opened when measuring the low illuminance.

$S_1$ is a main switch which is opened/closed by said push button P and formed to be closed when said push button P is pushed in and turn the circuit into the operational state. $S_{21}$, $S_{22}$, $S_{23}$ and $S_{24}$ are respectively a change over switch which is simultaneously changed over in interlocking with each other by means of said selective lever 4, and in response to the measuring variety to be selected, change over switch $S_{21}$ selects silicon photoelectromotive elements $C_B$, $C_G$, $C_I$ to be connected to the emitter of transistor $Q_1$, change over switch $S_{22}$ selects transistors $Q_2$, $Q_3$ to be connected to diode $D_5$, change over switch $S_{23}$, selects the compensation circuit to be connected to diode $D_2$, and change over switch $S_{24}$ selects the compensation resistance for ammeter M respectively. Measuring range change over switches $S_{31}$, $S_{32}$ simultaneously changed over by measuring range change over knob 5 are formed to change the combination of the diode and the compensation circuit in response to the measuring range changed over by said knob 5. That is, when the $d_1$ divisional measuring range is set up by measuring range change over knob 5, diodes $D_1$, $D_2$ are connected in series to transistor $Q_1$ and diodes $D_5$, $D_6$ are connected in series to transistor $Q_2$. And, in the case of the $d_2$ divisional measuring range, the series connection of diodes $D_1$, $D_2$ and the series connection of diodes $D_3$, $D_4$ are inserted in parallel with transistor $Q_1$, and diodes $D_5$, $D_6$ are connected in series to transistor $Q_2$. And further, in the case of the $t_1$, $t_2$ measuring ranges, diodes $D_1$, $D_2$ are connected in series to transistor $Q_1$ and the series connection of diodes $D_3$, $D_4$ and the series connection of diodes $D_5$, $D_6$ are inserted in parallel with transistor $Q_2$. On the other hand, when the measuring range is changed over as described above, a predetermined connection is selected also for bias circuit BC enclosed by a broken line for giving a bias to said diodes circuit in order that the central value of the divisional measuring range charged over coincides with O position (central position) of the ammeter.

In said diodes circuit, the reason why the diodes are connected in series by a pair is to obtain a more higher output voltage, and diodes $D_1$, $D_2$, $D_3$, $D_4$, $D_5$, $D_6$ which linear properties of current and voltage characteristics are good are selected.

And, $P_o$ is a resistor of the positive temperature coefficient well known as Posister, which betters the temperature compensation not enough effected only by said diodes circuit. That is, in general the characteristic of diode is changed by the temperature and the temperature coefficient thereof depends upon the voltage, so that when the output voltage is taken out by the diode as shown in the present invention, the temperature coefficient is changed by the output voltage thereof, therefore, on account of the mutual interference between the temperature and the output voltage some indication error due to the temperature is unavoidable. Whereas, in thre present invention, by means of the combination of said diodes for the $d_1$ divisional measuring range, respective photoelectric current of silicon photoelectromotive elements $C_B$, $C_R$ for the central value of said $d_1$ divisional measuring range is arranged to be equal to each other so as to compensate the temperature error to each other, and for the other divisional measuring ranges, the compensation is effected for portions to which diodes $D_3$, $D_4$ are added in parallel by means of said Posister $P_o$.

$R_T$ in compensative resistance group CC enclosed by a broken line for ammeter M is a thermistor for compensating the change due to the temperature of internal resistance of said ammeter M.

$S_{41}$ and $S_{42}$ are respectively a change over switch changed over simultaneously in interlocking with each other so as to select alternatively two terminals of terminal $m$ for the photometric circuit and terminal bc for checking the power voltage. $D_{10}$ is a Zenner diode for enlarging the deviation of the pointer of ammeter M when the power voltage is checked. $Q_6$ is a transistor which forms a fixed current circuit for holding the sum of the source current in the differential amplifier circuit composed of electric field effect transistors $Q_4$, $Q_5$ in constant, together with diodes $D_8$, $D_9$, resistances $R_5$, $R_{10}$, and semi-fixed resistance $SV_{r2}$.

Provided that the spectral energy detected by photoelectromotive element $C_R$ having the spectral sensitivity in the red wave length is $E_R$ and the spectral energy detected by photoelectromotive element $C_B$ having the spectral sensitivity in the blue wave length is $E_B$, between the ratio of these spectral energies $E_R$, $E_B$ and the color temperature represented by the mired unit there is the following relation:

$$(M) = \log (E_B/E_R) \tag{2}$$

Figure 4:
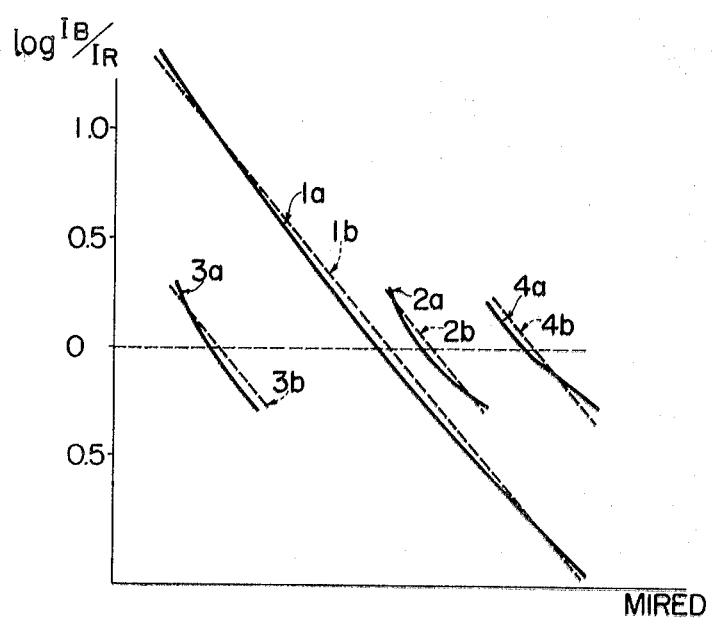
FIG. 4 is a diagram showing the principle for dividing the measuring range in the present invention.
Figure 5:
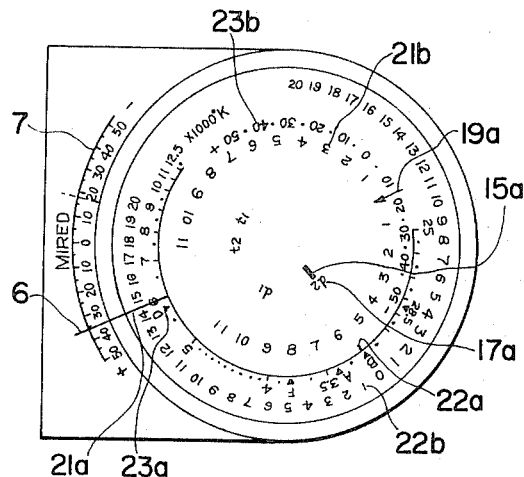
FIG. 5 is a top view of the dial disk of the embodiment shown in FIG. 1.
Figure 6:
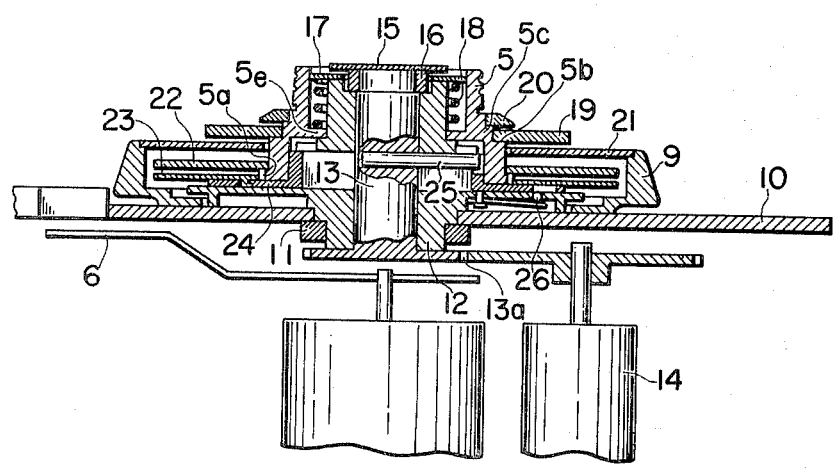
FIG. 6 is a longitudinal section of the dial disk system in said embodiment.
Figure 7:
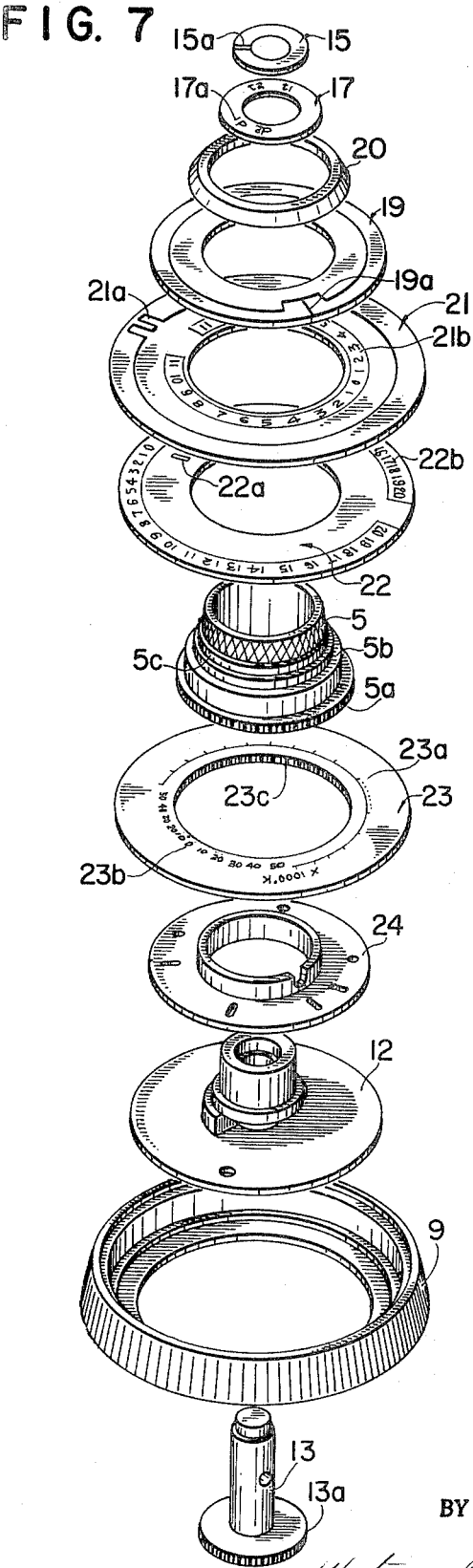
FIG. 7 is a perspective expansion plan of the dial disk system shown in FIG. 6.

This can be represented as shown by 1a in FIG. 4. Therefore, the output current from the photoelectric converter circuit in FIG. 3 is represented as follows:

$$I_R = E_R \times K_R$$
$$I_B = E_B \times K_B$$

Wherein, $K_R$ and $K_B$ are respectively a compensation constant decided by the optical property of the light receiving system and the circuit formation.

Thereupon, formula (1) is reformed as follows:

$$(M) = \log (I_B/I_R) + \log (K_R/K_B) \tag{3}$$

Therefore, by differencing compensation constants $K_R$, $K_B$ from each other it is possible to make the output ratio $I_B/I_R$ identical to the different color temperature. Therefore, it is possible to divide the range of color temperature to be measured into a suitable number of divisional measuring ranges to set up compensation constants for respective divisional measuring range in order that the output ratio to the central color temperature value of respective divisional measuring range is equal to each other. That is, curve 1a can be divided into curves 2a, 3a, 4a as shown in FIG. 4. On the other hand, in general, the relation of formula (3) is not linear but of a curve, however, by reducing the number of divisional measuring ranges within the limits permissible for the desired measuring precision, and selecting the spectral sensitivity of the silicon photoelectromotive element and suiting the compensation constant, formula (3) can be reformed to the following approximate formula:

$$M = C \log (I_B/I_R) + \log (K'_R/K'_B) \tag{4}$$

That is, by changing curve 1a to straight line 1b and curves 2a, 3a, 4a to straight lines 2b, 3b, 4b, the variations characteristics of the output ration in respective divisional measuring range become equal, and accordingly the deviation angle characteristics of the pointer of ammeter M for the change of the color temperature also become equal and it is possible to use a single scale system in common with every divisional measuring range. Hereupon, it would be obvious from the formula of Planck that the conversion to said approximate formula can be approximated to a straight line with the enough precision within the limits in which the curve of formula (3) is in need of the color temperature value, for example, in the extent from 2,500° to 12,000° K. And, in the photoelectric converter circuit in FIG. 3 the output voltage from every photoelectric converter circuit output portion composed of the combination of a plurality of diodes and the compensation circuit is in proportion to the logarithm of said every output current and the circuit is formed so that the current proportional to the difference of said output voltage may run to ammeter M, so that the pointer of ammeter M is deviated with the linear relation to the color temperature value represented by the mired unit, therefore, by graduating the scale of the ammeter with the mired unit said scale is made equal intervals, and as seen clearly from formula (4), FIG. 4, and the foregoing description related thereto it is possible to use said equal interval scale of the ammeter in common to every divisional measuring range. Further, also said R·G index is an indication unit related to the mired unit as described hereinbefore, so that on the same principle as that in which the color temperature is obtained from the spectral energy ratio of red to blue it is possible to indicate by the equal interval scale of said mired unit.

In FIGS. from 5 to 7 showing the scale disk system, the bottom of knob 5 for changing over the divisional measuring range is formed into the flange shape provided with ratchet 5a and has steps 5b, 5c, 5d. Numeral 9 is a reading dial, and in the sylindrical hole of dial shaft 12 fixed onto base plate 10 by nut 11, interlocking shaft 13 is fitted rotatably, and on the bottom of said interlocking shaft 13 there is provided gear 13 for interlocking with measuring range change over switch 14 and on the top thereof there is adhered index disk 15 on which index 15a is impressed for indicating the measuring range. Numeral 16 is an interlocking shaft supporting nut for preventing the descent of said interlocking shaft 13, and numeral 17 is a divisional measuring range disk on which marks 17a are impressed for indicating the divisional measuring range, and adhered on the top surface of said dial shaft 12. Numeral 18 is a spring for pressing interior annular protrusion 5e of change over knob 5 into contact with the step of dial shaft 12. And numeral 19 is a transparent R·G filter reading disk on which R·G index line 19a is impressed for reading the coefficient of the spectral distribution characteristic difference compensation filter, namely, so-called the green filter in accordance with the measuring results of the spectral energy ratio of red to green, and is fitted rotatably on step 5b of change over knob 5, so as to prevent coming out upward by means of keep ring 20 fitted fixedly on step 5C. Numeral 21 is a transparent index disk on which R·B index line 21a for reading the color temperature value and the color temperature conversion filter coefficient corresponding thereto by allowing it to coincide with ammeter pointer 6 brought by the spectral energy ratio of red to blue, and scale 21b for the green filter coefficient are impressed, and fitted fixedly on the inside step of said reading dial 9. Numeral 22 is a conversion color temperature display disk on which color temperature set up index 22a for setting up the color temperature appointed to the photosensitive material and coefficient scale 22b of the color temperature conversion filter are impressed, and fitted on change over knob 5 and fixed to the upper face of the flange portion thereof. Numeral 23 is a color temperature display disk on which color temperature scale 23 a is graduated with the absolute temperature 1,000° K unit and R·G index 23b is graduated for obtaining the measuring results of the spectral energy ratio of red to green, and provided inside thereof with ratchet 23c for engaging with ratchet 5a of said change over knob 5, and the engagement of said ratchets is released when said change over knob 5 is pulled up against spring 18. Numeral 24 is a supporting member which has said color temperature display disk 23 fixed thereto and rotates around dial shaft 12, and numeral 25 is an interlocking rod passing through respective interlocking hole of said supporting member 24 and said interlocking shaft 13 and allowing said color temperature display disk 23 and said interlocking shaft 13 to interlock with each other, and on said dial shaft 12 there is provided an escape slot for moving said interlocking rod 25. Numeral 26 is a click ball pushed up by a spring to form a click mechanism for changing over the measuring range, together with a click hole provided on said supporting member 24.

Here, said respective scale and index are arranged as follows: That is, for absolute temperature unit color temperature scale 23a on color temperature display disk 23, the color temperature value of the absolute temperature unit corresponding to mired scale 7 on the main body of color thermometer in accordance with respective divisional measuring range is graduated at unequal intervals so as to face to the mired scale system, and numerals using 1,000° K as one unit and marks showing the color temperature of such a specific light source as A light source are impressed. And for color temperature conversion filter coefficient scale 22b, angles corresponding to ten mireds of said mired scale 7 are graduated as one unit at equal intervals and 20 graduations are impressed on the right and left sides using the same angular position as the R·B index line 21b as O.

For R·G index scale 23b, 50 units are graduated every 10 units on the right and left at equal intervals, using the angle corresponding to two mireds of mired scale 7 as one unit, and for green filter coefficient scale 21b, ten units of said R·G index scale 23b are graduated as one unit at equal intervals, and in the counter-clockwise turning direction from O the green wave length absorbing filter is shown and in the clockwise direction the green wave length transmitting filter, namely, the red and blue wave length absorbing filter is shown. Here, relative positions of R·B index line 21a and green filter coefficient scale 21b on transparent index disk 21 and absolute temperature unit color temperature scale 23a and R·G index scale 23b on color temperature display disk 23 are arranged in order that O on green filter coefficient scale faces to the R·G index of the black body radiation having the color temperature value on color temperature scale 23a, which is indicated by R·B index line 21a. For example, as shown in fIG. 1, when R·B index line 21a indicates 6,000° K, O on green filter coefficient scale 21b faces to about 16.7 obtained from the following formula in which T = 6,000 is substituted to said formula (1), that is:

$$O_g = (1/2) [2,000 - (1,000,000/6,000)] = 16.7$$

In the foregoing formation, upon turning change over knob 5 while pulling up it the engagement of the ratchets is released, so that only conversion color temperature display plate 22 turns and the value on absolute temperature unit color temperature scale 23a for facing to color temperature set up index 22a undergoes a change, and upon allowing said color temperature set up index 22a to coincide with the color temperature appointed to the photosensitive material to be used, the relative positions of color temperature scale 23a corresponding thereto and the color temperature conversion filter coefficient scale are fixed. Next, upon turning changing over knob 5 under the state of that the ratchets are engaged with each other, color temperature display plate 23 is turned along with conversion color temperature display plate 22 and in interlocking therewith interlocking shaft 13 is turned, and further in interlocking with said interlocking shaft 13 change over switch 14 in the main body of color thermometer is changed over. Therefore, index plate 15 also is turned and when index 15a coincides with a divisional measuring range mark desired, change over switch 14 is set for a terminal corresponding to its divisional measuring range, and color temperature scale 23a faces to a value respondent respectively to said mired scale, without changing the relative position to color temperature conversion filter coefficient scale 22b set up in advance. For example, as shown in the drawings, when the index coincides with the divisional measuring range mark $d_2$, 7,800° K faces to O on the mired scale and about − 38 mired faces to 6,000° K. Here, upon setting up selective lever 4 for the position for measuring the spectral energy ratio of red to blue and closing the main switch by push button P while turning the light receiving face to the light source to be measured, pointer 6 of the ammeter is deviated. In this case, if said ammeter pointer 6 does no deviate it is only required to change over the divisional measuring range by means of said change over knob 5 as described hereinbefore. And, while holding said ammeter pointer 6 in the deviated position, upon turning reading dial 9 to allow R·B index line 21a to coincide with pointer 6, a value on color temperature scale 23a which R·B index line 21a indicates at that time is the absolute temperature unit color temperature of said light source to be measured, and a value on color temperature conversion filter coefficient scale 22b is the color temperature conversion filter coefficient for converting said light source to be measured to the color temperature of the photosensitive material appointed.

Then, upon setting up selective lever 4 for the position for measuring the spectral energy ratio of red to green and closing main switch $S_1$ to measure, ammeter pointer 6 indicates the R·G index with mired scale 7. Therefore, by allowing R·G index line 19a to coincide with the same value as the reading value effected by said pointer 6 on R·G index scale 23b, a value on green filter coefficient scale 21b, which said R·G index line 19a indicates, indicates the green wave length compensation filter to be used for the light source to be measured.

The present invention enables, as described above, to detect the spectral distribution characteristic of black body radiation and the difference of the spectral distribution characteristic of incident light rays therefor and simultaneously read the color temperature conversion filter coefficient therefor and the green wave length compensation filter coefficient, by dividing the whole measuring range into a plurality of divisional measuring ranges and using the scale of the ammeter in common to a single scale at equal intervals so as to use in common for every divisional measuring range of black body radiation and measuring red to green.

What is claimed is:

1. A multi-range indicating system for indicating a color temperature of an illuminating source in a three color meter across a color temperature range comprising:

a color temperature range being divided into a plurality of different color measuring ranges;

an operating member for changing between the different color measuring ranges and rotatable about and slidable along a fixed axis between a first position and a second position;

an indicating means including a meter having a first scale graduated at equal intervals in mired units and an indicating pointer for indicating a color temperature on said scale, and a R·G index for indicating deviations from the center of a selected range associated with the position of said pointer on said first scale;

a first disc member mounted on said operating member symmetrically about said fixed axis and including a second scale for indicating color temperature conversion filter coefficients graduated at equal intervals in ten mired units, and a marker for indicating a desired color temperature, said second scale being arranged adjacent to said first scale;

a second disc member concentrically mounted with respect to said first disc member including a third scale for indicating color temperature in degrees Kelvin mounted to face said second scale and rotatable in interlocking relationship with said operating member in said first position for aligning said second disc in a desired relationship with said first scale for coordinating said color temperature in degrees Kelvin with said first scale;

a movable shaft rotatable with said operating member coaxial with said fixed axis, and slidable along said fixed axis with said operating member between said first position and said second position;

a range indicating means provided on said movable shaft and on said fixed axis;

a range setting means interconnected with said movable shaft in said first position; and a transparent disc member covering said first disc member and second disc member and having a line mark and a green filter coefficient scale graduated at equal intervals in ten units of said R·G index scale, and having an interconnection angle between said line mark and said green filter coefficient scale wherein the origin point on said coefficient scale is aligned with the R·G index and the absolute temperature on said third scale is indicated by said line mark.

* * * * *